United States Patent
Kim et al.

(10) Patent No.: US 11,543,994 B2
(45) Date of Patent: Jan. 3, 2023

(54) CONTROLLING ACCESS REQUESTS OF REQUEST NODES

(71) Applicant: Arm Limited, Cambridge (GB)

(72) Inventors: Ho-Seop Kim, Austin, TX (US); Joseph Michael Pusdesris, Austin, TX (US); Miles Robert Dooley, Austin, TX (US)

(73) Assignee: Arm Limited, Cambridge (GB)

( * ) Notice: Subject to any disclaimer, the term of this patent is extended or adjusted under 35 U.S.C. 154(b) by 71 days.

(21) Appl. No.: 17/078,304

(22) Filed: Oct. 23, 2020

(65) Prior Publication Data
US 2022/0129186 A1   Apr. 28, 2022

(51) Int. Cl.
*G06F 3/06*   (2006.01)

(52) U.S. Cl.
CPC .......... *G06F 3/0655* (2013.01); *G06F 3/0604* (2013.01); *G06F 3/0673* (2013.01)

(58) Field of Classification Search
CPC ..... G06F 3/0655; G06F 3/0604; G06F 3/0673
See application file for complete search history.

(56) References Cited

U.S. PATENT DOCUMENTS

| | | | |
|---|---|---|---|
| 9,904,624 B1* | 2/2018 | Huberty | G06F 12/0875 |
| 2014/0136795 A1* | 5/2014 | Tang | G06F 15/8069 |
| | | | 711/137 |
| 2020/0409880 A1* | 12/2020 | Choudhary | G06F 13/4282 |

* cited by examiner

*Primary Examiner* — Gary W. Cygiel
(74) *Attorney, Agent, or Firm* — Nixon & Vanderhye P.C.

(57) ABSTRACT

A request node is provided, that includes request circuitry for issuing outgoing memory access requests to a remote node. Status receiving circuitry receives statuses regarding remote memory access requests at the remote node and control circuitry controls at least one of a rate or an aggression at which the outgoing memory access requests are issued to the remote node in dependence on at least some of the statuses. The control circuitry is inhibited from controlling the rate or the aggression until multiple statuses are received.

16 Claims, 8 Drawing Sheets

| Aggression / Rate level | # outstanding requests |
|---|---|
| 0 | 96 |
| 1 | 96 |
| 2 | 96 ← current |
| 3 | 80 |
| 4 | 65 |
| 5 | 50 |
| ⋮ | ⋮ |
| N | 24 |

Permissible levels for change: {1, 2, 3}

CONTROLLING ACCESS REQUESTS OF REQUEST NODES

TECHNICAL FIELD

The present disclosure relates to data processing. For instance, the present disclosure may have relevance to the use of request nodes in an interconnect system.

DESCRIPTION

In, for instance, an interconnected system, a request node might send one or more access requests to, for instance, a memory controller. The memory controller could receive requests from a number of request nodes, and so an indication of how busy the memory controller is can be passed back to the request nodes for them to moderate the sending of access requests.

SUMMARY

Viewed from a first example configuration, there is provided a request node comprising: request circuitry to issue outgoing memory access requests to a remote node; status receiving circuitry to receive statuses regarding remote memory access requests at the remote node; and control circuitry to control at least one of a rate or an aggression at which the outgoing memory access requests are issued to the remote node in dependence on at least some of the statuses, wherein the control circuitry is inhibited from controlling the rate or the aggression until a plurality of the statuses have been received.

Viewed from a second example configuration, there is provided a method of data processing comprising: receiving statuses regarding remote memory access requests at a remote node; and controlling at least one of a rate or an aggression at which outgoing memory access requests are issued to the remote node in dependence on at least some of the statuses, wherein the rate or the aggression is inhibited from being controlled until a plurality of the statuses have been received.

Viewed from a third example configuration, there is provided a request node comprising: means for receiving statuses regarding remote memory access requests at a remote node; and means for controlling at least one of a rate or an aggression at which outgoing memory access requests are issued to the remote node in dependence on at least some of the statuses, wherein the rate or the aggression is inhibited from being controlled until a plurality of the statuses have been received.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Before discussing the embodiments with reference to the accompanying figures, the following description of embodiments is provided.

In accordance with one example configuration there is provided a request node comprising: request circuitry to issue outgoing memory access requests to a remote node; status receiving circuitry to receive statuses regarding remote memory access requests at the remote node; and control circuitry to control at least one of a rate or an aggression at which the outgoing memory access requests are issued to the remote node in dependence on at least some of the statuses, wherein the control circuitry is inhibited from controlling the rate or the aggression until a plurality of the statuses have been received.

The inventors have discovered that continually making instantaneous responses to the status indicators can result in poor performance One explanation for this could be that immediate responses result in a cycle of underuse followed by rate/aggressiveness increase, followed by overuse, followed by throttling, which results in underuse and so on. Accordingly, in the present technique, a plurality of statuses, which can be used to indicate busyness, is received before control of the rate/aggressiveness at which requests are issued occurs. This causes the control to occur using a larger amount of knowledge than would be possible if an immediate response was to occur each time (e.g. as soon as a status is received). Consequently, by exhibiting patience and not always immediately responding, a more appropriate decision regarding memory access request control can be made. The remote nodes, which issue the statuses and receive the access requests, may take the form of, for instance, memory controllers, prefetchers, etc.

In some examples, the control circuitry is adapted to control the rate or the aggression at which the outgoing memory access requests are issued based on those of the statuses received by the status receiving circuitry during a window. The window could be defined as a number of status indicators that are received or could be defined as being a period of time. During this window, status requests that are received are used in combination in order to control the rate or the aggression at which the outgoing memory requests are issued. This way, the rate or aggression is based on a number of status indicators that are received.

In some examples, the request node comprises: aggregation circuitry to aggregate the statuses received by the status receiving circuitry during a window to produce an aggregated value; and the control circuitry is adapted to control the rate or the aggression at which the outgoing memory access requests are issued to the remote node in dependence on the aggregated value. The status indicators that are received by the status receiving circuitry can be aggregated in order to produce an aggregated value. This aggregated value is used by the control circuitry in order to control the rate or the aggression. There are a number of ways in which such aggregation can be achieved. In some examples, the aggregation takes the form of a sum or an average such as a mean, mode, or median. Other examples could include a standard deviation or other distribution model in order to bid at all of the status indicators that are received over a window in order to determine how the rate or the aggression should be adjusted. Again, the window could be defined as a number of statuses that are received or could be defined by a period of time in which statuses are received. For instance, if an average status (e.g. busyness) during the window is above some threshold, this could cause rate or the aggression to be dropped or lowered, while the average falling below the threshold could result in the rate or aggression being increased or be kept at the current value.

In some examples, the request node comprises first counter circuitry to count a number of the statuses having a first status during the window. An example of aggregation that can be performed is counting the number of statuses that have a first status during the window. For instance, the first counter circuitry could be used to count the number of statuses that are received during the window that have a status indicating that a memory controller is overburdened.

There are a number of different ways of categorising the status that each of the statuses imparts. However, in some examples, each of the statuses corresponds with the remote node being one of: underloaded, acceptably loaded, and overloaded. The nature of what it means for a remote note such as a memory controller to be underloaded, acceptably loaded or overloaded is of course architecturally dependent. However, one may consider the acceptably loaded category to define the boundaries of what is considered to be appropriate given normal usage of the request node, keeping in mind the capabilities of the underlying hardware. Below this level, the remote node can be considered to be underloaded, and above this level the remote node can be considered to be overloaded.

In some examples, the first status corresponds with the remote node being overloaded; and the control circuitry is adapted to throttle the rate or the aggression in response to the number of the statuses that correspond with the remote node being overloaded during the window being at least a first threshold value. In these examples, the first counter circuitry is used to count the number of statuses that are received during a window that indicate the remote node is overloaded. In response to the number of such statuses received during the window exceeding or meeting a first threshold value, the rate or the aggression is throttled. For instance, the window could be defined as being 256 received statuses, and the first threshold value could be defined as being 16. In this situation, if 16 out of the 256 statuses indicate the remote node is overloaded then the rate or the aggression of the request circuitry can be reduced. This in turn would reduce the burden placed on the remote node by the request circuitry.

In some examples, the first counter circuitry is adapted to decrement the number of the statuses having the first status during the window in response to the status receiving circuitry receiving a status corresponding with the remote node being underloaded. In some examples, when indication is received that a remote node is underloaded/underburdened, the value held in the first counter circuitry is decremented. In this way, an underloaded status effectively cancels out an overburdened status. In general, it will be rare that some nodes will be overburdened while other nodes are underburdened. Consequently, this is unlikely to result in a situation where overburdened remote nodes become more heavily burdened as a consequence of those statuses being cancelled out by other remote nodes indicating an underburdening.

Although in some examples, the decrementation occurs in response to any status indicator indicating that the remote node is underburdened, in some examples, the first counter circuitry is adapted to decrement the number of the statuses having the first status during the window in response to the status receiving circuitry receiving a status corresponding with the remote node having a lowest level of loading. Consequently, decrementation occurs only in the most severe cases of underloading where the remote node is shown to have a lowest level of loading that can be represented by the status. This can have the affect that decrementation is heavily discouraged unless remote node is severely underburdened.

In some examples, the request node comprises: second counter circuitry to count a number of the statuses having a second status during the window; the second status corresponds with the remote node being acceptably loaded; and the control circuitry is adapted to increase the rate or the aggression in response to both: the number of the statuses that correspond with the remote node being acceptably loaded during the window being less than a second threshold value, and the number of the statuses that correspond with the remote node being overloaded during the window being less than the first threshold value. The second counter circuitry can be used to count the number of statuses that are received during the window that indicate the remote node being acceptably loaded. In these examples, there are a number of changes that may be made to the rate or the aggression based on the values of the first counter and the second counter. Firstly, if the remote node is considered to be overburdened as a consequence of the first counter value being greater than or equal to the first threshold value, then throttling of the rate or aggression is performed. Otherwise, if the number of statuses that are received indicate an acceptable burdening, the current level of the rate or aggression could remain the same, tend towards a target level of aggression, or could adjust the aggression based on the current level of aggression. Finally (e.g. in other situations), the rate or the aggression is increased. Consequently, a small amount of overburdening is permitted provided that it does not reach a particular threshold (e.g. the first threshold). If that threshold is met then the rate or aggression is decreased. Otherwise, the rate or aggression is increased. In this way, these embodiments can be made to actively push for a greater number of access requests to be made.

In some examples, the control circuitry is adapted to set a desired rate or desired aggression to so that the statuses indicate an acceptable level of loading. This way, the request node may be capable of having a default rate or aggression value, which is maintained in the absence of any impetus to do so. That is, that the "acceptable" level of burdening is actively aimed for. For example, the control circuitry might change the move towards the desired rate or aggression in response to: the number of the statuses that correspond with the remote node being overloaded during the window being less than the first threshold value; and the number of the statuses that correspond with the remote node being acceptably loaded during the window being greater than or equal to the second threshold value. In other examples, the values chosen for the threshold values might be such that the system will try to target a particular level of aggression.

In some examples, the second counter circuitry is adapted to decrement the number of the statuses having the second status during the window in response to the status receiving circuitry receiving a status corresponding with the remote node being underloaded. As discussed above, in some examples, the second counter can be decremented in response to statuses indicating that the memory controller is underloaded. This makes it more difficult for burden placed on a memory controller to be lowered unless there is significant overburdening of the remote nodes.

In some examples, the second counter circuitry is adapted to decrement the number of the statuses having the second status during the window in response to the status receiving circuitry receiving a status corresponding with the remote node having a lowest level of loading. Again, as previously described, such decrementation of the second counter circuitry can be restricted to a situation in which the status indicator indicates a lowest level of loading.

In some examples, the outgoing memory access requests are issued to a plurality of remote nodes by the request circuitry; the remote memory access requests are at the plurality of remote nodes; and the statuses regard the remote memory access requests at the plurality of remote nodes. In these examples, a plurality of remote nodes exists. Received status indicators collectively relate to the plurality of remote nodes rather than to a single remote node. In these situations, it is possible that the burden on each of the remote nodes differs. It could theoretically result in uneven distribution of burden whereby certain memory controllers are overburdened and other memory controllers are underburdened. In these situations, it could be the case that the burden placed on the memory controllers is increased even though certain of the memory controllers are already overburdened. However, it is anticipated that since the memory controllers equally distribute the memory space (e.g. since the memory controller might each be responsible for an equal amount of memory, with those parts of the memory being equally distributed), it is statistically unlikely that any one memory controller will be excessively burdened as compared to the others. The rate or aggression change considers the average situation of each of the memory controllers and therefore acts for the greater good in determining whether there should be a change to the rate or aggression.

In some examples, the statuses are grouped together into sets; and each of the statuses within each set, except for a last received status in that set, has a hysteretical effect on the control circuitry. Hysteresis can be used in order to control the extent to which given change in a system causes response. In these examples, rather than immediately responding to each of the status indicators, but one of the statuses within a set (specifically the final status of that set) is a delayed response to the change of rate or aggression of the access circuitry. In this way, the request node is able to exhibit "patience" in respect of making any decision for a change of rate or request, and therefore a repeated cycle of increases and decreases in rate be smoothed.

In some examples, the control circuitry is adapted to limit the rate of change in rate or aggression. For instance, if the rates/aggressions are defined as a number of modes or levels and the current mode/level is a particular value then the control circuitry could be limited to changing the mode/level to a neighbouring mode/level of the current mode/level. In this way, the response to changes in demand of the remote nodes can be gradual.

In some examples, the statuses indicate whether the remote node is in single thread mode or multi thread mode; and the control circuitry is adapted to increase the rate or the aggression in response to a predetermined number of the statuses indicating that the remote node is in the single thread mode. In a single thread mode of operation (e.g. where each remote node is handling requests for a single request node), it could be desirable to increase the rate or the aggression, since the busyness indicators could be considered to be more trustworthy and overheads could be lower. By requiring a predetermined number of such indicators to be received (e.g. X single thread indicators without a multi thread indicator being received), it is possible to reduce the risk of the rate or aggression being received unless the system genuinely is in the single thread mode of operation.

In some examples, the control circuitry is adapted to bias the rate or the aggression towards a preferred rate or a preferred aggression. This could be, for instance, by the selection of threshold values to which the counters are compared in order to prompt a change in rate or aggression, or could be by the movement towards the preferred rate or aggression when no other impetus to change rate or aggression exists.

Particular embodiments will now be described with reference to the figures.

Figure 1:
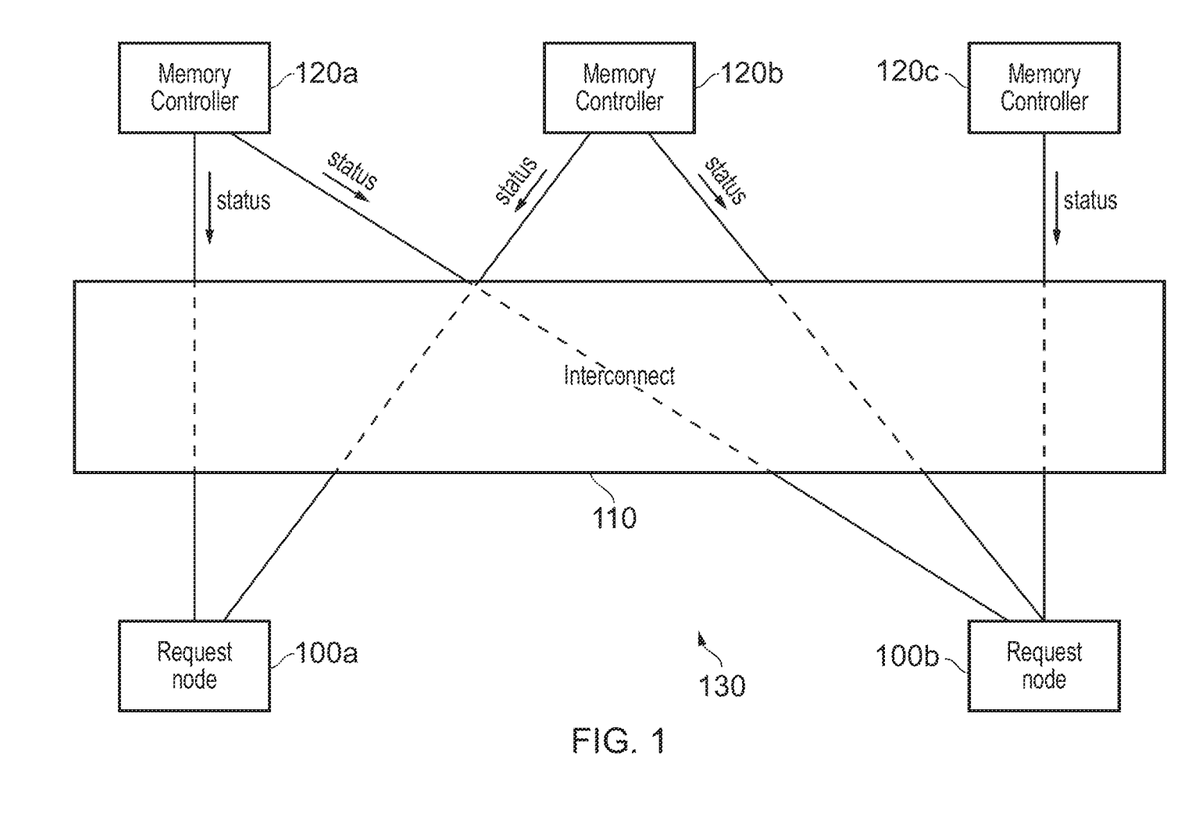
FIG. 1 illustrates a data processing system, which contains a number of request nodes in accordance with some embodiments.

FIG. 1 illustrates a data processing system 130, which contains a number of request nodes 100a, 100b in accordance with some embodiments, together with a number of memory controllers 120a, 120b, 120c (which are an example of the claimed remote node). The request nodes 100a, 100b and the memory controllers 120a, 120b, 120c are connected together using an interconnect 110. Each of the request nodes 100a, 100b issues memory access requests to at least some of the memory controllers 120a, 120b, 120c via the interconnect 110. Each memory controller 120a can receive memory access requests from multiple request nodes 100a, 100b and the net effect of the memory access requests is not known by any one request node 100a, 100b. As a consequence of this, it is impractical for a single request node 100a to be aware of how busy a given memory controller 120a is. Consequently, each of the memory controllers 120a, 120b, 120c issues status updates to the request nodes 100a, 100b that indicate a status of the current memory access requests being processed by that memory controller 120a, 120b, 120c. Such status updates could be sent separately, but also can be sent as part of another communication back to the request nodes 100a, 100b—an acknowledgement of a memory access request being received, for instance. For the purposes of these examples, it is assumed that the status update is sent as a pair of bits in another communication that is sent to the request nodes 100a, 100b such as an acknowledgement.

In this way, each of the request nodes 100a, 100b can control sending the memory access requests, slowing down (throttling) or speeding up the sending of memory access request to adapt to the current busyness of the memory controller or controllers 120a, 120b, 120c. In particular, such control can be carried out for each memory controller individually—e.g. throttling the sending of memory access requests to a very busy controller while leaving the rate/ aggressiveness at which memory access requests to other memory controllers 120a, 120b, 120c untouched. Alternatively, such control can be carried out as a global factor thereby controlling the rate/aggressiveness at which memory access requests are sent to all memory controllers 120a, 120b, 120c.

Figure 2:
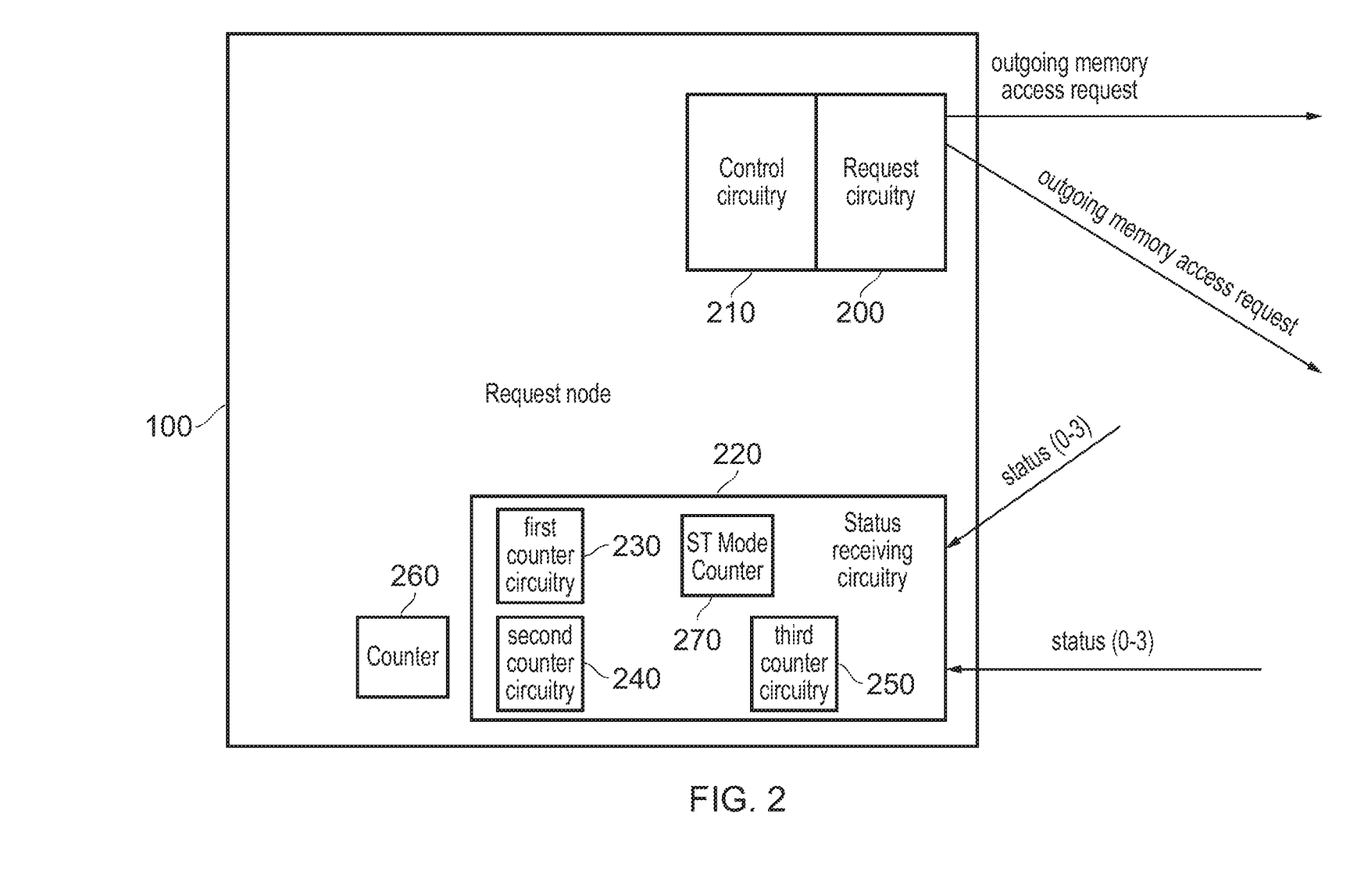
FIG. 2 illustrates an example of a request node in accordance with some embodiments.

FIG. 2 illustrates an example of a request node 100 in accordance with some embodiments. The request node 100 includes request circuitry 200, which is responsible for sending memory access requests to the memory controllers 120a, 120b, 120c. The rate/aggressiveness at which the request circuitry 200 sends the memory access requests is controlled by control circuitry 210, which is in turn controlled by cbusy values/status indicators received by the status receiving circuitry 220. 'Cbusy' refers to the completer node (or the remote node)'s busyness indication. The status receiving circuitry 220 considers the status indicators received in incoming messages from the memory controllers 120a, 120b, 120c. In these examples, the status indicators occupy a pair of bits and therefore encoded as a number from 0 to 3. In effect, the status indicator indicates a level of busyness of the memory controller 120a, 120b, 120c that issued the status indicator. A value of 0 (2'b00) is the lowest loading, and could in some examples indicate that the memory controller 120a, 120b, 120c is unloaded. A value of 1 (2'b01) indicates a low level of loading. A value of 2 (2'b10) indicates an acceptable level of loading. This is the level of loading that is desired to be achieved for a given memory controller and is slightly below the final level represented by a '3' (2'b11), which indicates that the memory controller 120a, 120b, 120c is overburdened. The acceptable level (2) is said to be the desired/default level in that this does not necessitate any action being taken by the request node 100 and a level of burdening that achieves this status is generally aimed for.

As previously explained, in these examples, a plurality of status indicators are used to inform each decision to adjust the behaviour of the control circuitry 210. Consequently, instantaneous responses to the status indicators are not continually made. Instead, the cbusy values/status indicators are aggregated in order to form an overall picture of the busyness of the memory controllers 120a, 120b, 120c. In practice, this is achieved by means of a cbusy counters in the form of a first counter circuit 230, a second counter circuit 240, and a third counter circuit 250. These circuits count the number of instances of certain values of the status indicators over a phase of time (e.g. over 256 received statuses). In this example, the third counter circuitry 250 counts the number of instances of the status indicators having a value corresponding to 'overburdened' (e.g. '3'). The second counter circuitry 240 counts the number of instances of the status indicators having a value corresponding to 'acceptable' (e.g. '2'). The first counter circuitry 230 counts the number of instances of the status indicators having a value corresponding to 'underburdened' (e.g. '1'). The status indicator value of '0' is not recorded and in this example, is simply disregarded. However, in other example (as illustrated with respect to FIG. 4), such status indicator values could have a different effect on the values of some or all of the counter circuitries 230, 240, 250. A counter 260 can be used to count the total number of status indicators received in the current phase.

Then, depending on the values of the counters 230, 240, 250 once the phase has completed (e.g. when the counter 260 reaches 256), the control circuitry 210 can control the rate/aggressiveness at which the request circuitry 200 issues memory access requests to the memory controllers 120a, 120b, 120c.

It will be appreciated that the present technique is not limited to a system where the status indicator occupies only 2 bits. In other embodiments, a greater fidelity of indicator is possible and further counter circuits 230, 240, 250 can be provided. Of course, the length of each phase is not limiting on the present technique either, and different lengths can be selected. In some embodiments, a further bit is provided as part of the status indicator to indicate the mode of operation of the memory controllers 120a, 120b, 120c. In particular, this further bit indicates whether the particular memory controller issuing the status indicator has in-flight requests from multiple request circuits (indicating a 'multi thread' mode) or not (indicating a 'single thread' mode). In general, it could be desirable to increase the aggression or rate of the request circuitry 200 if the corresponding memory controller 120a, 120b, 120c is in a single thread mode. This is because the busyness estimate can be considered to be more reliable. However, the system will generally try to be conservative and hence be biased towards operating in a multi thread mode. In some embodiments, this is achieved by means of an ST mode counter 270. In this example, each time a status indicator indicates that a memory controller is in the single thread mode, the counter is increased. When a status indicator indicates that a memory controller is in the multi thread mode, the counter is reset (e.g. set to 0). When the counter saturates (e.g. when it reaches 511), the system enters a single thread mode (where the aggression or rate is increased) until a status indicator indicates that a memory controller is in the multi thread mode of operation. In this way, a strong bias is provided towards operating in multi thread mode. Of course, other variants could also be used. For instance, the resetting of the counter could cause the counter to reach its maximum value. Whenever a single thread indicator is received, the counter can be decremented with the system entering single thread mode when the counter reaches 0. As another alternative, a less biased system could be provided. For instance, the counter could change (increase or decrease) by 1 each time a single thread indicator is received, and change in the opposite direction (decrease or increase) by 4 each time a multi thread indicator is received. When the counter saturates (when the counter increases) or reaches zero (when the counter decreases), the system enters single thread mode.

Figure 3:
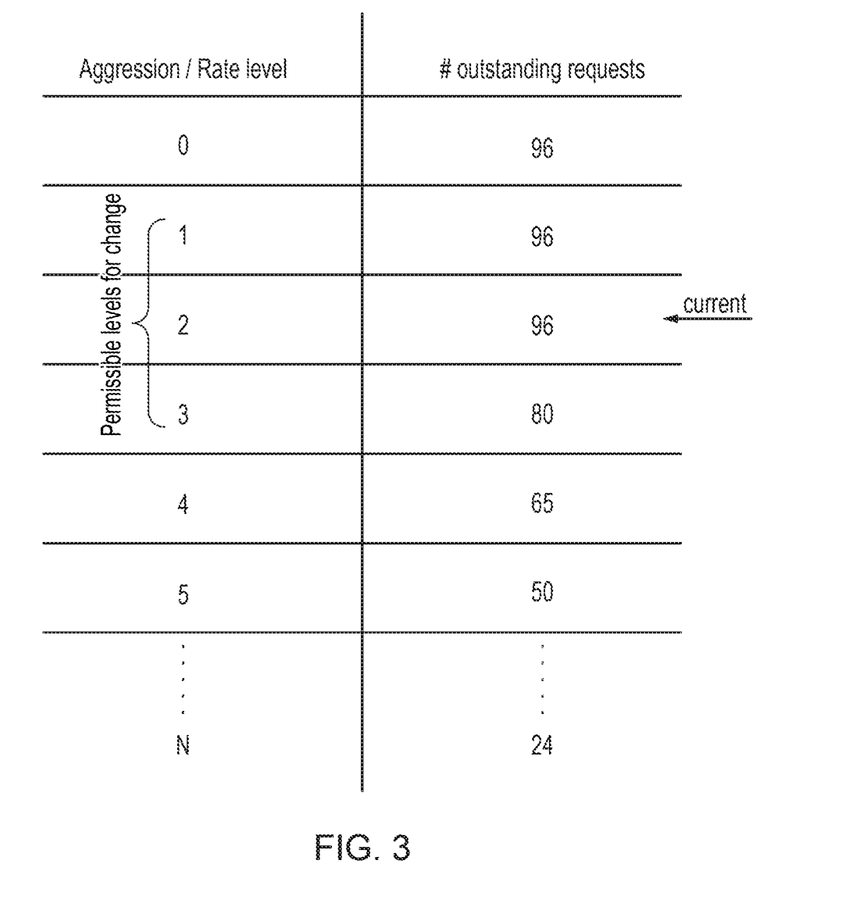
FIG. 3 illustrates an example of aggression/rate levels for the outgoing memory access requests in accordance with some examples.

FIG. 3 illustrates an example of cbusy mode or aggression/rate levels for the outgoing memory access requests. In this example a lower level corresponds with a higher aggression/rate and a higher level corresponds with a lower aggression/rate. The active rate/aggression level is changed in response to receiving a plurality of the statuses. In this example, the request circuitry takes the form of a prefetcher, which prefetches memory when there is available bandwidth in the memory system.

In this example, a cbusy mode or level of 0 means that the request circuitry/prefetcher is permitted to have 96 requests outstanding at any time. That is, that there can be up to 96 requests 'in flight'. At levels 1 and 2, the number of outstanding requests remain at 96. From level 3, the number of outstanding requests is reduced. In particular, level 3 permits 80 outstanding requests, level 4 permits 65 outstanding requests, and level 5 permits 50 outstanding requests. The number of levels is, of course, configurable and the present example illustrates a level N in which there are 24 outstanding requests.

In some examples, when a change in aggression/rate is dictated, the request circuitry/prefetcher is restricted to changing to a neighbouring level, thereby limiting the rate of change of rate or aggression. For instance, if the request circuitry is currently operating at level 2 (96 requests in flight) then at the end of the phase, the request circuitry/prefetcher can change to level 1, remain the same, or change to level 3. However, it cannot change to level 4 for instance. In order to reach level 4, the request circuitry/prefetcher would have to change to level 3 and the result of the next phase would then have to dictate a further change to level 4. In this way, the resulting change in aggression/rate is gradual.

During the single thread mode of operation, the aggression/rate level is increased as compared to the multi thread mode of operation. For instance, if it is determined that the system should operate at an aggression/rate of level 3, but the system is then determined to be in single thread mode, the aggression/rate is set to level 4. Alternatively, the default calculation could be for the single thread mode, with the aggression/rate level being decreased if the system is in multi thread mode.

Figure 4:
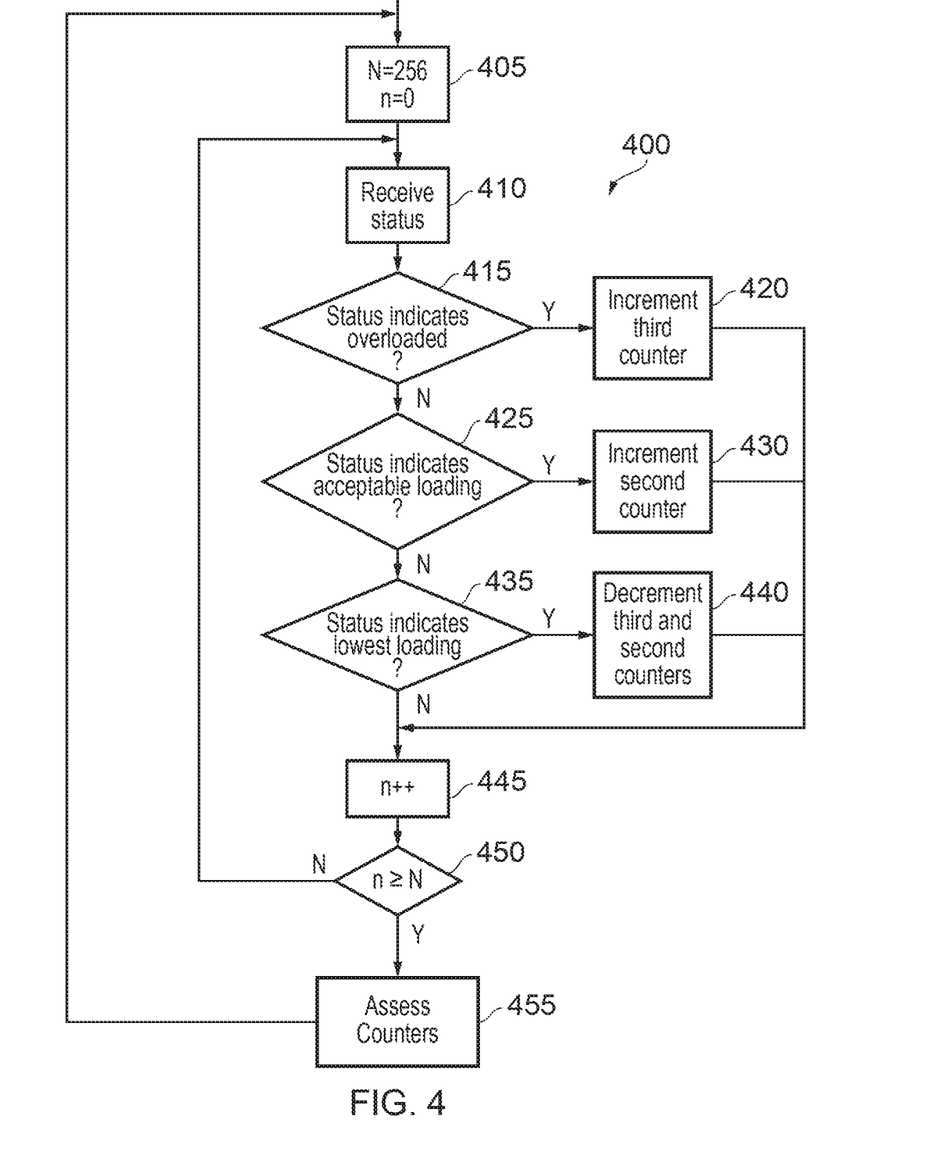
FIG. 4 illustrates a flowchart that shows a method of data processing in accordance with some embodiments.

FIG. 4 illustrates a flowchart 400 that shows a method of data processing in accordance with some embodiments. The process begins at a step 405 where the value N (the number of statuses received within a phase) is set. In this example, N is set to 256. The loop counter n is also set to 0. At a step 410, a status is received. At a step 415, it is determined whether the received status indicates that a memory controller is overloaded. If so, the third counter is incremented at step 420 and the process proceeds to step 445. Otherwise, at step 425, it is determined whether the status indicates that the memory controller is acceptably loaded. If so, then at step 430, the second counter is incremented and the process proceeds to step 445. Otherwise, at step 435, it is determined whether the status indicates a lowest level of loading of the memory controller. If so, then at step 440, the third and second counters are decremented and the process proceeds to step 445. Otherwise, the process simply proceeds to step 445. At step 445, the loop counter n is incremented and at step 450, it is determined whether the loop is complete. If not, the process returns to step 410 to receive a next status indicator. Otherwise, at step 455, the counters are assessed, which could cause a change in aggression or rate. The process then returns to step 405 so that a new phase can begin with the new aggression/rate. An example of the assessment is illustrated with respect to FIG. 6.

Figure 5:
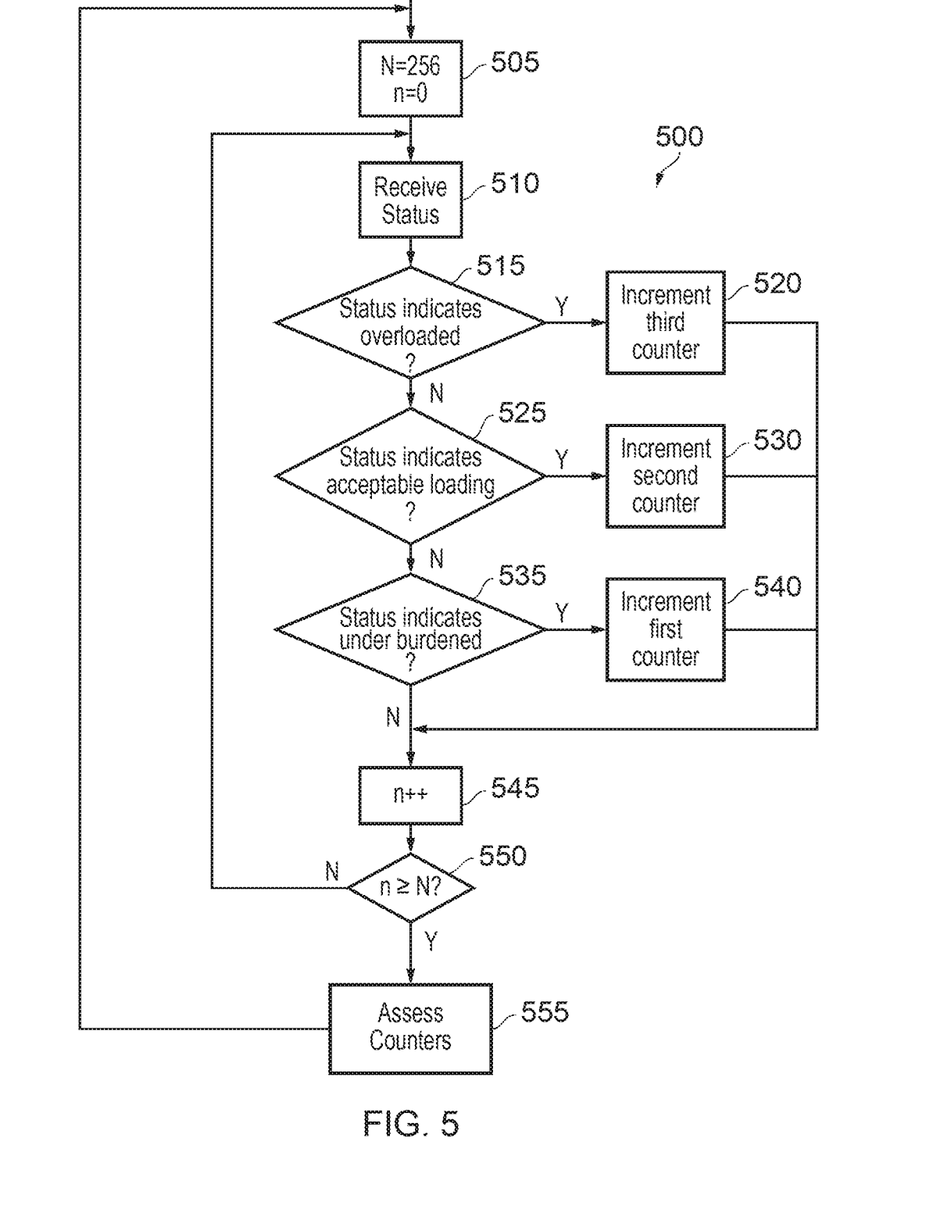
FIG. 5 illustrates a flowchart that shows an alternative method of data processing in accordance with some embodiments.

FIG. 5 illustrates a flowchart 500 that shows an alternative method of data processing in accordance with some embodiments. The process begins at a step 505 where the value N (the number of statuses received within a phase) is set. In this example, N is set to 256. The loop counter n is also set to 0. At a step 510, a status is received. At a step 515, it is determined whether the received status indicates that a memory controller is overloaded. If so, the third counter is incremented at step 520 and the process proceeds to step 545. Otherwise, at step 525, it is determined whether the status indicates that the memory controller is acceptably loaded. If so, then at step 530, the second counter is incremented and the process proceeds to step 545. Otherwise, the process simply proceeds to step 545. At step 535, it is determined whether the status indicates that the memory controller has a low level of loading. If so, then at step 540, the first counter is incremented and the process proceeds to step 545. At step 545, the loop counter n is incremented and at step 550, it is determined whether the loop is complete. If not, the process returns to step 510 to receive a next status indicator. Otherwise, at step 555, the counters are assessed and the rate or aggression level is changed. The process then proceeds back to step 505. Again, the process of accessing the rate and/or aggression level is illustrated with respect to FIG. 6 for instance.

In this variant, no decrementing of the counters occurs in response to an underburdening (e.g. the lowest level of burdening) occurring.

Figure 6:
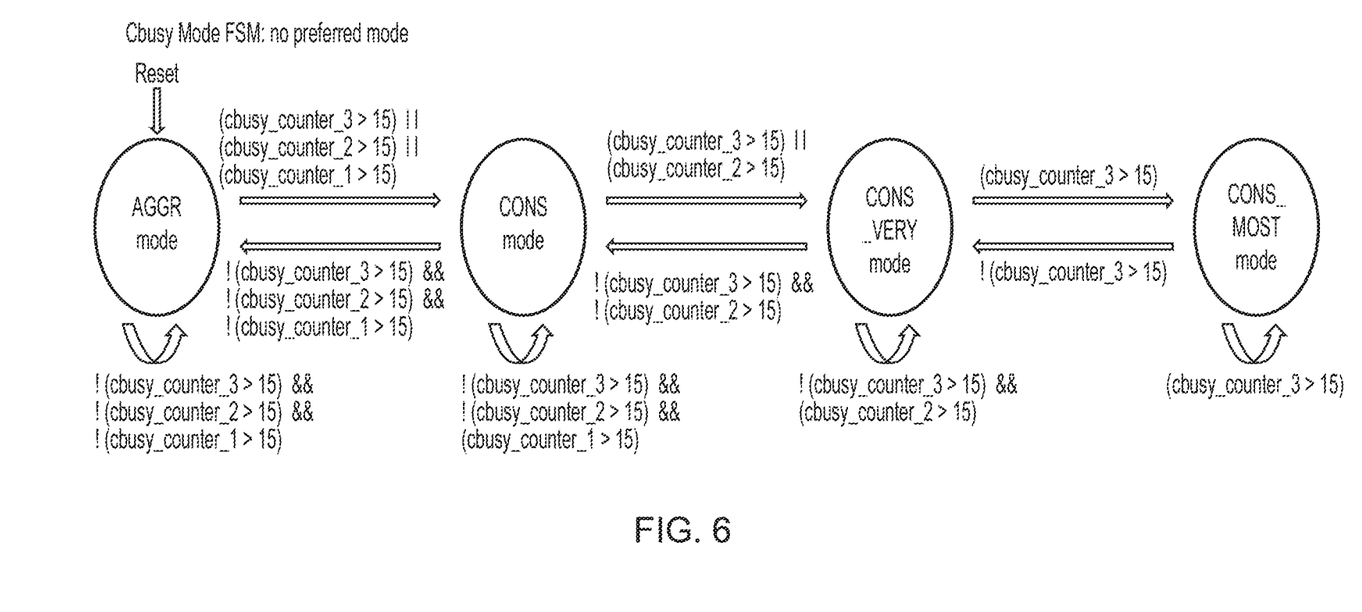
FIG. 6 illustrates an example of a finite state machine that shows a series of transitions between modes based on the counters shown in FIG. 5.

FIG. 6 shows a finite state machine that illustrates a series of example transitions between cbusy modes based on the previously described counters. FIG. 6 therefore shows how the counters can be assessed in order to determine the rate and/or aggression level of prefetching. In this example, there are only four modes (AGGR, CONS, CONS_VERY, CONS_MOST) of decreasing rate/aggression. The system begins operation in the AGGR mode, which is the most aggressive (highest rate) of the modes. A move from AGGR to CONS will occur if any of the cbusy counters 230, 240, 250 is above 15. A move from CONS to CONS_VERY occurs if the first counter 230 or the second counter 240 is greater than 15 and a move from CONS_VERY to CONS_MOST occurs if the first counter 230 is above 15 (e.g. indicating that the system remains overburdened). When in the CONS_MOST mode, if cbusy_counter_3 (e.g. the third counter) remains at 15 then the state simply remains in CONS_MOST. There is not a yet more conservative state to enter in this example. The reverse conditions also hold. For instance, a move from CONS_MOST to CONS_VERY occurs if cbusy_counter_3 is not greater than 15. A move from CONS_VERY to CONS occurs if cbusy_counter_3 is not greater than 15 and if cbusy_counter_2 is not greater than 15. A move from CONS to AGGR occurs if each of the counters is not greater than 15. In other cases, the states remain the same. For instance, at the state CONS_VERY, the system remains in the state CONS_VERY if cbusy_coutner3 is not greater than 15 (which would cause a move to CONS_MOST) and if cbusy_counter_2 is greater than 15 (such that a decrease to CONS is not warranted).

In this way, the aggression/rate change is dependent on $\frac{1}{16}$ of the statuses for a phase having a particular value. For instance, the conservativeness will decrease each phase the number of statuses indicating an overburdening reaches $\frac{1}{16}$ of the total statuses for that phase.

Figure 7:
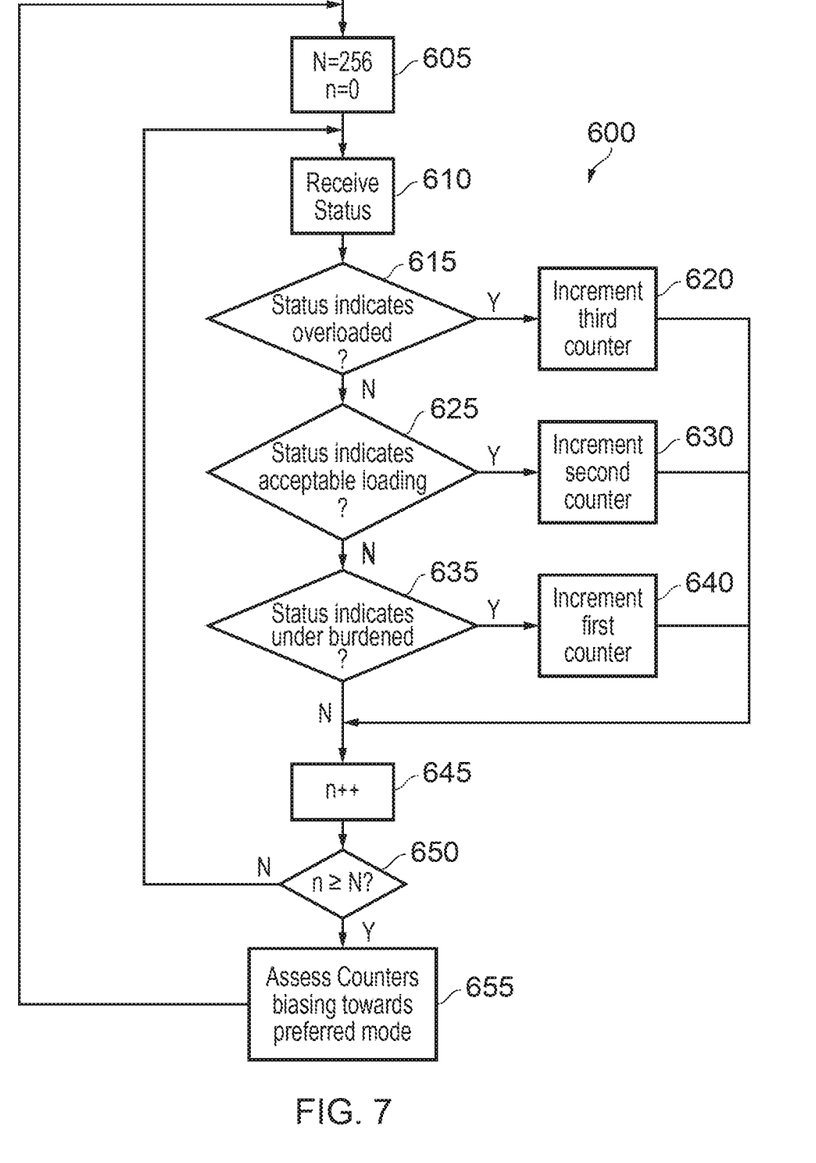
FIG. 7 illustrates a flowchart that shows an alternative method of data processing in accordance with some embodiments.

FIG. 7 illustrates a flowchart 600 that shows an alternative method of data processing in accordance with some embodiments. The process begins at a step 605 where the value N (the number of statuses received within a phase) is set. In this example, N is set to 256. The loop counter n is also set to 0. At a step 610, a status is received. At a step 615, it is determined whether the received status indicates that a memory controller is overloaded. If so, the third counter is incremented at step 620 and the process proceeds to step 635. Otherwise, at step 625, it is determined whether the status indicates that the memory controller is acceptably loaded. If so, then at step 630, the second counter is incremented and the process proceeds to step 635. Otherwise, at step 635 it is determined whether the status indicates that the memory controller has a low loading. If so then at step 640, the first counter is incremented and the process proceeds to step 645. At step 645, the loop counter n is incremented and at step 650, it is determined whether the loop is complete. If not, the process returns to step 610 to receive a next status indicator. Otherwise, at step 655, the counters are assessed and the rate/aggression level is changed. In this example, however, the rate or aggression is biased towards a preferred rate/aggression level. For instance, the comparison values chosen for the counters might bias a particular mode. Alternatively, rather than maintain the status quo, the system might naturally attempt to push the state towards a particular preferred mode to see if the system will tolerate it.

Figure 8:
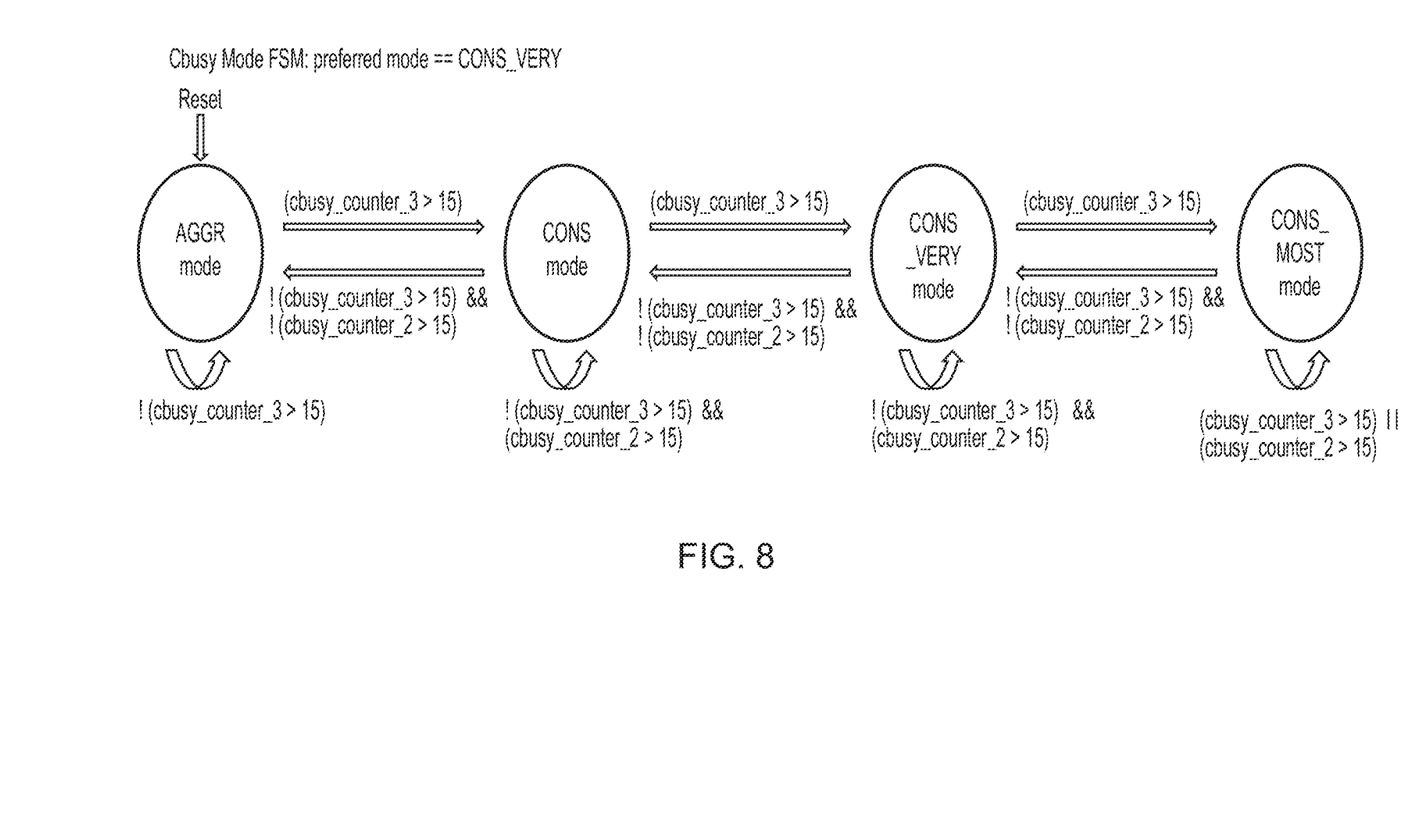
FIG. 8 illustrates an example of a finite state machine that shows another series of transitions between modes based on the counters shown in FIG. 7.

FIG. 8 shows a finite state machine that illustrates a series of example transitions between cbusy modes based on the previously described counters. In this particular example, the transitions are biased so that in operation, the system will tend towards the CONS_VERY state. In particular, a transition from AGGR to CONS, CONS to CONS_VERY, or CONS_VERY to CONS_MOST occurs when the cbusy_counter_3 is greater than 15. The values of the other counters are not considered for such transitions. Meanwhile, a move from CONS_MOST to CONS_VERY, from CONS_VERY to CONS or a move from CONS to AGGR will occur if cbusy_counter_3 is not greater than 15 and if cbusy_counter_2 is not greater than 15. The counter cbusy_counter_1 is not considered at all. The motivation for that is the preferred mode, in this case CONS_VERY. By not being affected by cbusy_counter_1, which represents system being lightly loaded, requester can stay aggressive. This results in the overall system becoming more loaded and is more likely to stay in the preferred CONS_VERY state.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. A request node comprising:
   request circuitry to issue outgoing memory access requests to a remote node;
   status receiving circuitry to receive statuses regarding remote memory access requests at the remote node;
   control circuitry to control at least one of a rate or an aggression at which the outgoing memory access requests are issued to the remote node in dependence on at least some of the statuses;
   first counter circuitry to count a number of the statuses having a first status during a window; and
   second counter circuitry to count a number of the statuses having a second status during the window, wherein:
   the control circuitry is inhibited from controlling the rate or the aggression until a plurality of the statuses have been received;
   the second status corresponds with the remote node being acceptably loaded; and
   the control circuitry is adapted to increase the rate or the aggression in response to both:
      the number of the statuses that correspond with the remote node being acceptably loaded during the window being less than a second threshold value, and
      the number of the statuses that correspond with the remote node being overloaded during the window being less than the first threshold value.

2. The request node according to claim 1, wherein the control circuitry is adapted to control the rate or the aggression at which the outgoing memory access requests are issued based on those of the statuses received by the status receiving circuitry during the window.

3. The request node according to claim 1, comprising:
   aggregation circuitry to aggregate the statuses received by the status receiving circuitry during a window to produce an aggregated value; and
   the control circuitry is adapted to control the rate or the aggression at which the outgoing memory access requests are issued to the remote node in dependence on the aggregated value.

4. The request node according to claim 1, wherein each of the statuses corresponds with the remote node being one of: underloaded, acceptably loaded, and overloaded.

5. The request node according to claim 1, wherein the first status corresponds with the remote node being overloaded; and
   the control circuitry is adapted to throttle the rate or the aggression in response to the number of the statuses that correspond with the remote node being overloaded during the window being at least a first threshold value.

6. The request node according to claim 1, wherein the first counter circuitry is adapted to decrement the number of the statuses having the first status during the window in response to the status receiving circuitry receiving a status corresponding with the remote node being underloaded.

7. The request node according to claim 1, wherein the first counter circuitry is adapted to decrement the number of the statuses having the first status during the window in response to the status receiving circuitry receiving a status corresponding with the remote node having a lowest level of loading.

8. The request node according to claim 1, wherein the control circuitry is adapted to set a desired rate or desired aggression to so that the statuses indicate an acceptable level of loading.

9. The request node according to claim 1, wherein the second counter circuitry is adapted to decrement the number of the statuses having the second status during the window in response to the status receiving circuitry receiving a status corresponding with the remote node being underloaded.

10. The request node according to claim 1, wherein the second counter circuitry is adapted to decrement the number of the statuses having the second status during the window in response to the status receiving circuitry receiving a status corresponding with the remote node having a lowest level of loading.

11. The request node according to claim 1, wherein the outgoing memory access requests are issued to a plurality of remote nodes by the request circuitry;
    the remote memory access requests are at the plurality of remote nodes; and
    the statuses regard the remote memory access requests at the plurality of remote nodes.

12. The request node according to claim 1, wherein the statuses are grouped together into sets; and
    each of the statuses within each set, except for a last received status in that set, has a hysteretical effect on the control circuitry.

13. The request node according to claim 1, wherein the control circuitry is adapted to limit the rate of change in rate or aggression.

14. The request node according to claim 1, wherein the statuses indicate whether the remote node is in single thread mode or multi thread mode; and the control circuitry is adapted to increase the rate or the aggression in response to a predetermined number of the statuses indicating that the remote node is in the single thread mode.

15. The request node according to claim 1, wherein the control circuitry is adapted to bias the rate or the aggression towards a preferred rate or a preferred aggression.

16. A method of data processing comprising:

receiving statuses regarding remote memory access requests at a remote node;

controlling at least one of a rate or an aggression at which outgoing memory access requests are issued to the remote node in dependence on at least some of the statuses;

counting a number of the statuses having a first status during a window; and counting a number of the statuses having a second status during the window inhibiting the rate or the aggression from being controlled until a plurality of the statuses have been received; wherein:

the second status corresponds with the remote node being acceptably loaded; and the control circuitry increases the rate or the aggression in response to both:

the number of the statuses that correspond with the remote node being acceptably loaded during the window being less than a second threshold value, and the number of the statuses that correspond with the remote node being overloaded during the window being less than the first threshold value.

* * * * *